(12) United States Patent
Gschwind et al.

(10) Patent No.: US 9,557,917 B2
(45) Date of Patent: *Jan. 31, 2017

(54) CONDITIONAL STACK FRAME ALLOCATION

(71) Applicant: International Business Machines Corporation, Armonk, NY (US)

(72) Inventors: Michael Karl Gschwind, Chappaqua, NY (US); Ronald I. McIntosh, Toronto (CA); Ulrich Weigand, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 124 days.

This patent is subject to a terminal disclaimer.

(21) Appl. No.: 14/536,921

(22) Filed: Nov. 10, 2014

(65) Prior Publication Data
US 2016/0132246 A1 May 12, 2016

(51) Int. Cl.
| G06F 9/44 | (2006.01) |
| G06F 3/06 | (2006.01) |
| G06F 9/45 | (2006.01) |
| G06F 9/50 | (2006.01) |

(52) U.S. Cl.
CPC .......... *G06F 3/0604* (2013.01); *G06F 3/0631* (2013.01); *G06F 3/0673* (2013.01); *G06F 8/41* (2013.01); *G06F 8/4434* (2013.01); *G06F 9/5016* (2013.01)

(58) Field of Classification Search
CPC ........ G06F 8/75; G06F 11/3604; G06F 17/15; G06F 8/42; G06F 8/433; G06F 8/436
See application file for complete search history.

(56) References Cited

U.S. PATENT DOCUMENTS

| 5,493,675 A | 2/1996 | Faiman, Jr. et al. |
| 5,729,748 A | 3/1998 | Robbins et al. |
| 5,835,958 A * | 11/1998 | Long ............... G06F 9/4425 707/999.202 |
| 6,321,275 B1 | 11/2001 | McQuistan et al. |
| 6,408,433 B1 * | 6/2002 | Click, Jr. ............... G06F 8/447 717/154 |

(Continued)

FOREIGN PATENT DOCUMENTS

CA  2074615 A1  1/1994

OTHER PUBLICATIONS

Tomas Lang; Reduced Register Saving Restoring in Single-Window Register Files; 1986 ACM; pp. 17-26; <http://dl.acm.org/citation.cfm?id=381714>.*

(Continued)

*Primary Examiner* — Thuy Dao
*Assistant Examiner* — Cuong V Luu
(74) *Attorney, Agent, or Firm* — Robert J. Shatto

(57) ABSTRACT

A method for allocating memory includes an operation that determines whether a prototype of a callee function is within a scope of a caller. The caller is a module containing a function call to the callee function. In addition, the method includes determining whether the function call includes one or more unnamed parameters when a prototype of the callee function is within the scope of the caller. Further, the method may include inserting instructions in the caller to allocate a register save area in a memory when it is determined that the function call includes one or more unnamed parameters.

9 Claims, 9 Drawing Sheets

(56) References Cited

U.S. PATENT DOCUMENTS

| | | | |
|---|---|---|---|
| 7,653,806 B2 | 1/2010 | Hansen et al. | |
| 7,861,227 B2* | 12/2010 | Motoyama | G06F 8/10 717/117 |
| 7,992,140 B2* | 8/2011 | Meijer | G06F 8/427 717/114 |
| 8,438,551 B2* | 5/2013 | Tonkin | G06F 8/42 717/137 |
| 8,458,678 B2* | 6/2013 | Meijer | G06F 8/427 717/114 |
| 8,533,668 B2* | 9/2013 | de Oliveira Costa | G06F 8/75 717/110 |
| 2003/0217356 A1 | 11/2003 | Baraz et al. | |
| 2011/0246973 A1* | 10/2011 | Meijer | G06F 8/427 717/140 |
| 2013/0212563 A1* | 8/2013 | Kraft | G06F 8/75 717/123 |
| 2015/0331978 A1* | 11/2015 | Englehart | G06F 17/5009 703/2 |

OTHER PUBLICATIONS

David Callahan; Register Allocation via Hierarchical Graph Coloring ; 1991 ACM; pp. 192-203; <http://dl.acm.org/citation.cfm?id=113462>.*

Keith D. Cooper; Register Promotion in C Programs; 1997 ACM; pp. 308-319; <http://dl.acm.org/citation.cfm?id=258943>.*

Butler W. Lampson; Fast Procedure Calls; 1982 ACM; pp. 66-76; <http://dl.acm.org/citation.cfm?id=801827&CFID=662754461&CFTOKEN=37633493>.*

Miguel Huguet; A Reduced Register File for RISC Architectures; 1985 ACM; pp. 22-31; <http://dl.acm.org/citation.cfm?id=381756>.*

Byung-Sun Yang; LaTTe A Java VM Just-in-Time Compiler with Fast and Efficient Register Allocation; 1999 IEEE; 11 pages; <http://ieeexplore.ieee.org/stamp/stamp.jsp?arnumber=807503>.*

Unknown, Power Architecture 64-Bit ELF V2 ABI Specification, OpenPOWER ABI for Linux Supplement, Version 1, Jul. 21, 2014, IBM.

Weigand, U., "[Patch] PowerPC64 ELFv2 ABI 4/6: Stack frame layout changes," Message 316, Nov. 12, 2013. Grace Period Disclosure. https://sourceware.org/ml/libc-alpha/2013-11/msg00316.html.

Weigand, U., "[Patch, rs6000] ELFv2 ABI 2/8: Remove function descriptors," Message 1141. Nov. 11, 2013. Grace Period Disclosure. http://gcc.gnu.org/ml/gcc-patches/2013-11/msg01141.html.

Weigand, U., "[Patch, rs6000] ELFv2 ABI 4/8: Struct passing calling convention changes," Message 1145. Nov. 11, 2013. Grace Period Disclosure. http://gcc.gnu.org/ml/gcc-patches/2013-11/msg01145.html.

Weigand, U., "[Patch, rs6000] ELFv2 ABI 6/8: Eliminate register save area in some cases," Message 1149, Nov. 11, 2013. Grace Period Disclosure https://gcc.gnu.org/ml/gcc-patches/2013-11/msg01149.html.

Gschwind et al., "Conditional Stack Frame Allocation", U.S. Appl. No. 14/568,404, filed Dec. 12, 2014.

Gschwind et al., "Assigning Home Memory Addresses to Function Call Parameters", U.S. Appl. No. 14/536,902, filed Nov. 10, 2014.

Gschwind et al., "Assigning Home Memory Addresses to Function Call Parameters", U.S. Appl. No. 14/568,392, filed Dec. 12, 2014.

List of IBM Patents or Patent Applications Treated as Related.

* cited by examiner

CONDITIONAL STACK FRAME ALLOCATION

STATEMENT REGARDING PRIOR DISCLOSURES BY THE INVENTOR OR A JOINT INVENTOR

The following disclosure(s) are submitted under 35 U.S.C. 102(b)(1)(A): Messages 1141 (2013-11) and 1149 (2013-11) posted to the GCC (compiler) website (http://gcc.gnu.org/ml/gcc-patches) as a mailing list message. Message 316 (2013-11) posted to the glibc (system library and dynamic loader) website (https://sourceware.org/ml/libc-alpha) as mailing list messages. Power Architecture 64-bit ELF V2 ABI Specification, OpenPOWER ABI for Linux Supplement, 21 Jul. 2014.

BACKGROUND

The present disclosure relates to compiling source code in a computer system, and more specifically, to the manner in which a compiler provides stack space associated with passing parameters to a function when it is called and how a home memory location for a parameter passed in a register may be provided.

A function definition or prototype typically declares parameters in a parameter list between parentheses. For example, the function "func1" may be defined as: void func1 (int x, float y, long z). The parameters of func1 are x, y, and z. The parameters are of data type integral, float, and long, respectively. The term "parameter" may be used to refer to a variable named in the parenthesized parameter list and "argument" may be used to refer to a particular value that is used in a function call. However, those skilled in the art may refer to the value that is used in a function call as a parameter and may a variable as an argument, the intended meaning being clear from the context.

In the some programming languages, such as the C language, a function can have a variable number of arguments. A function that can have a variable arguments is referred to as a variadic function. A variadic function may be declared with an ellipsis as its last parameter, matching zero or more arguments on a call and indicating that the types and number of arguments may vary. An example of a variadic function is printf (int x, float y, . . . ).

An application binary interface ("ABI") is the set of rules that must be followed by any interface between two program modules at the level of machine code. Among other things, an ABI defines how functions are called and how arguments are passed to functions, i.e., calling conventions. Every parameter has a data type. An ABI generally specifies how each of the various different data types is passed when a function is called. Generally, arguments can be passed in memory, registers, or a combination of memory and registers. Generally, an ABI may specify that a particular argument is to be passed in a register or a memory location. A compiler typically compiles source code according the rules and conventions specified in an ABI.

SUMMARY

According to embodiments of the present disclosure, a computer-implemented method for allocating memory includes an operation that determines whether a prototype of a callee function is within a scope of a caller. The caller is a module containing a function call to the callee function. In addition, the method includes determining whether the function call includes one or more unnamed parameters when a prototype of the callee function is within the scope of the caller. Further, the method may include inserting instructions in the caller to allocate a register save area in a memory when it is determined that the function call includes one or more unnamed parameters.

Various embodiments are directed to a system and computer program product for allocating memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
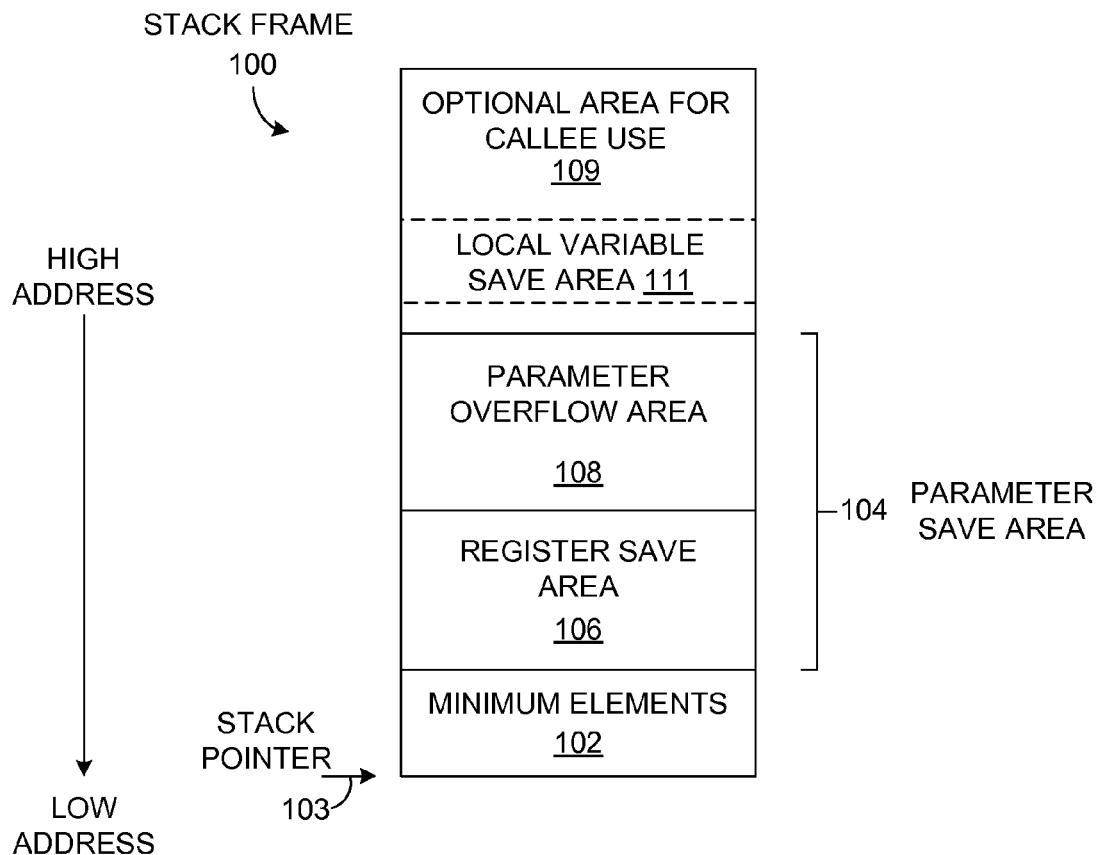
FIG. 1 shows the relative layout of elements in a stack frame according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to compiling source code in a computer system, with more particular aspects relating to the manner in which a compiler provides stack space associated with passing parameters to a function when it is called and how a home memory location for a parameter passed in a register may be provided. While the present disclosure is not necessarily limited to such applications, various aspects of the disclosure may be appreciated through a discussion of various examples using this context.

FIG. 1 shows the relative layout of elements in a stack frame 100 according to various embodiments. The stack frame 100 includes minimum elements 102, a parameter save area 104, and an optional area for callee use 109. The parameter save area 104 includes a register save area 106 and a parameter overflow area 108. The minimum elements 102 are required. The minimum elements 102 consume 32 bytes. The optional area for callee use 109 may include a local variable save area 111. A stack pointer 103 ("SP") points to the lowest address in the stack frame, which may be referenced as SP+0.

In various embodiments, the minimum elements 102 may include a back chain double word, a CR (condition register) save word, a reserved word, an LR (link register) save double word, and TOC (table of contents) pointer double word.

Figure 2:
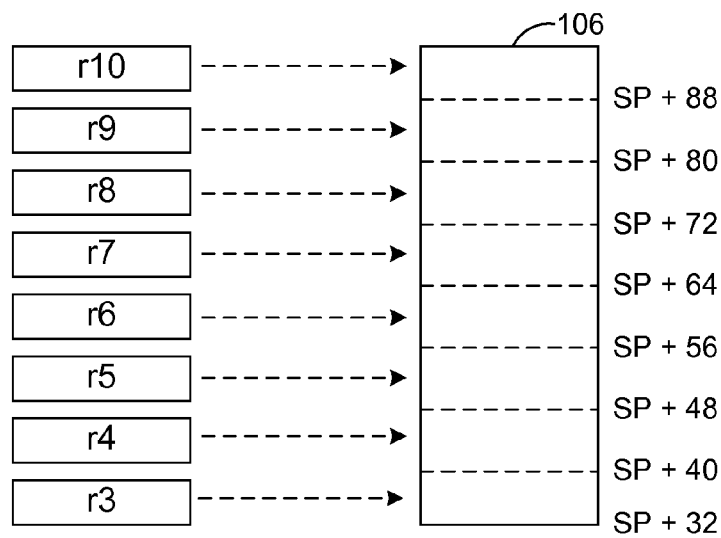
FIG. 2 depicts a correspondence between general purpose registers and a register save area according to various embodiments.

In one embodiment, the register save area 106 is the first 64 bytes of the parameter save area 104. The lowest address in the parameter save area 104 is at SP+32. The lowest address in the parameter overflow area 108 is just above the highest address of the register save area 106. For example, if 64 bytes are allocated for the register save area 106, the lowest address in the parameter overflow area 108 is at SP+96. In various embodiments, a processor provides eight general purpose registers ("GPRs") for passing parameter and return values. In one example, registers r3-r10 are GPRs provided for passing parameters and return values. Each of the registers r3-r10 is 64 bits wide, which corresponds to a double word. The register save area 106 provides an area for storing values that may be contained in the GPRs r3-r10. In various embodiments, there is a one-to-one correspondence between GPR register numbers and an address offset in the register save area 106. See FIG. 2, for example, which shows a correspondence between the GPRs and the register save area. In FIG. 2, the first eight bytes of the register save area 106 correspond to GPR r3, the next eight bytes correspond to GPR r4, and so on.

In this description and in the claims, the term "parameter" may be used to refer to either a variable named in the parenthesized parameter list of a function prototype or a value used in a function call. Similarly, the term "argument" may be used to refer to either a particular value that is used in a function call or a variable named in the parenthesized parameter list of a function prototype. The meaning of these terms will be apparent to one skilled in art based on the context.

The parameter overflow area 108 is optional, however, a legacy ABI treats the register save area 106 as required. One reason for requiring a caller to allocate a register save area 106 is for use with function calls where the called function uses a variable number of arguments. Allocating a register save area allows the called function to save up to eight arguments in the eight GPRs into the register save area 106. When this save operation is performed, up to eight arguments of the function will be arranged in a linear order on the stack frame 100. When the elements are arranged in linear order in memory, the called function can employ a simple "va_list" method to access the arguments. However, when a legacy ABI requires a register save area 106, the stack frame may be larger than necessary.

In the C language, a variable of type va_list can be declared. This description uses as an example, a variable of type va_list named "ap." However, it will be appreciated that any name for the variable may be chosen. The variable ap is initialized using the va_start macro to point to the first argument. Each time the va_arg macro is subsequently invoked on ap, it returns the next argument in a list, e.g., the register save area 106.

A legacy feature of some programming languages permits a first function to call a second function in the absence of a prototype for the second function. As further described below, this makes it impossible for a compiler to determine whether the function call includes unnamed parameters.

Reducing the minimum size requirement for stack frames may be important for environments where stack space is restricted, e.g. Linux kernel code, or where there are a large number of stacks, e.g. heavily multi-threaded applications. At the same time, it can be important for a new ABI to support features of legacy ABIs and programming languages, such as permitting function calls in the absence of a prototype, as well as supporting efficient implementations of variadic functions in accordance with the known ISO C stdarg facility.

Conditional Stack Frame Allocation

According to various embodiments, a compiler determines whether a prototype of a callee function is within a scope of a module containing a function call, i.e., whether the function is declared and "known" to the compiler. When a prototype is known, the compiler determines whether the function call includes one or more unnamed parameters. According to various embodiments, a register save area 106 in a caller's stack frame is optionally allocated.

When a prototype is known, if the function call is found to include one or more unnamed parameters, the compiler inserts instructions in object code to allocate a register save area and, if needed, a parameter overflow area in a memory. In at least one embodiment, when a register save area is allocated, the register save area has a fixed size regardless of the number of arguments being passed.

When a prototype is known, if the function call is found to include only named parameters, the compiler determines whether all parameters of the function can be passed in registers. If all parameters of the function cannot be passed in registers, the compiler inserts instructions to allocate a register save area and a parameter overflow area in a memory. If all parameters of the function can be passed in registers, these areas are not allocated in memory.

When the compiled module is executed (prototype known), named parameters are passed in their natural registers. If all parameters of the function cannot be passed in their natural registers, the parameters that cannot be passed in a register are passed in the parameter's natural location in memory.

When a prototype of the callee function is not known, the compiler determines whether all parameters of the function can be passed in registers. If all parameters can be passed in registers, the compiler inserts instructions in object code to allocate a register save area and, if needed, a parameter overflow area in the stack frame of the caller. If all parameters cannot be passed in registers, the compiler inserts instructions in object code to allocate a register save area and a parameter overflow area in memory.

When the compiled module is executed (prototype unknown), a parameter of vector type is passed in one or more general purpose registers to the extent that general purpose registers are available and a parameter of floating point type is passed in a general purpose register to the extent that general purpose registers are available. In addition, the parameter of vector type is also passed in its natural register, i.e., in a vector register, and the parameter of floating point type is also passed in its natural register, i.e., in a floating point register.

Figure 3:
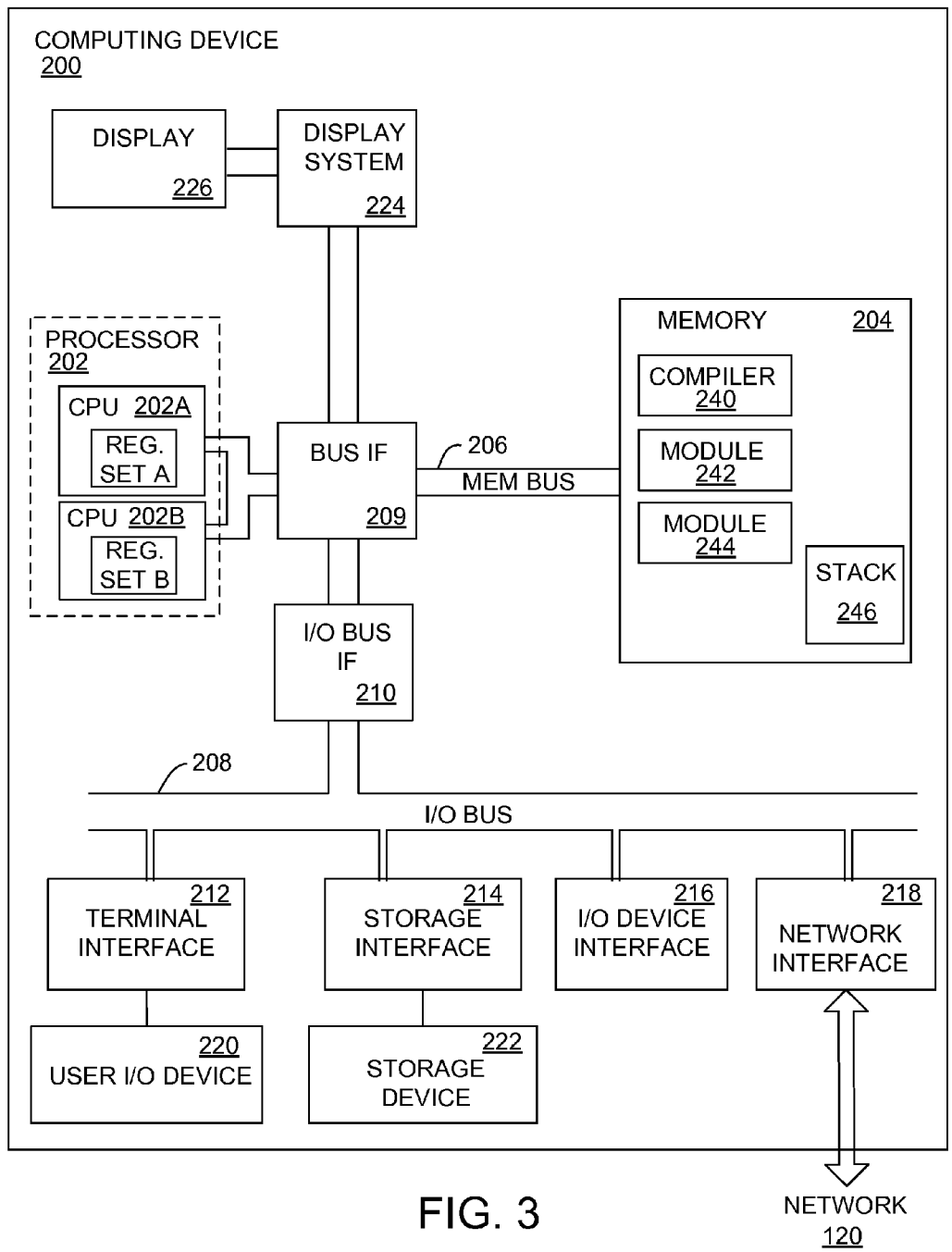
FIG. 3 is a block diagram of an example of a computing device in which various embodiments of this disclosure can be implemented.

FIG. 3 is a block diagram of an example of a computing device in which various embodiments of this disclosure can be implemented. The computing device 200 is one example of a context in which various embodiments may be implemented. The mechanisms and apparatus of the various embodiments disclosed herein apply equally to any appropriate computing device. The major components of the computing device 200 include one or more processors 202, a memory 204, a terminal interface 212, a storage interface 214, an Input/Output ("I/O") device interface 216, and a network interface 218, all of which are communicatively coupled, directly or indirectly, for inter-component communication via a memory bus 206, an I/O bus 208, bus interface unit ("IF") 209, and an I/O bus interface unit 210.

Figure 4:
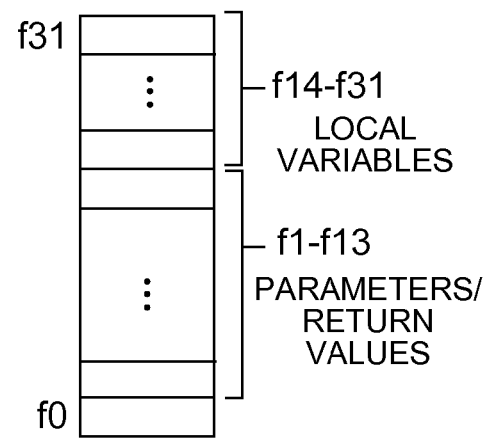
FIG. 4 is a simplified diagram showing registers that may be included in a processor of a computing device, according to various embodiments.
Figure 4:
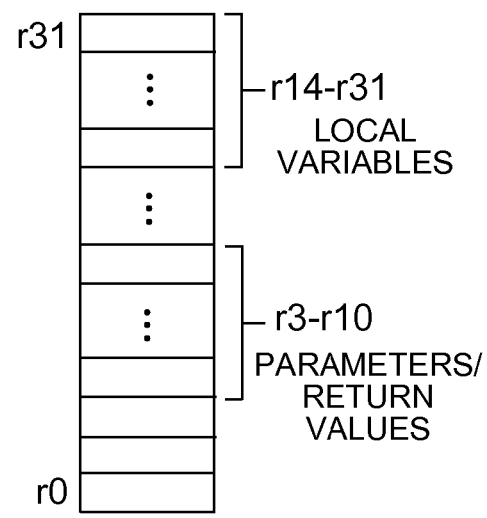
Figure 4:
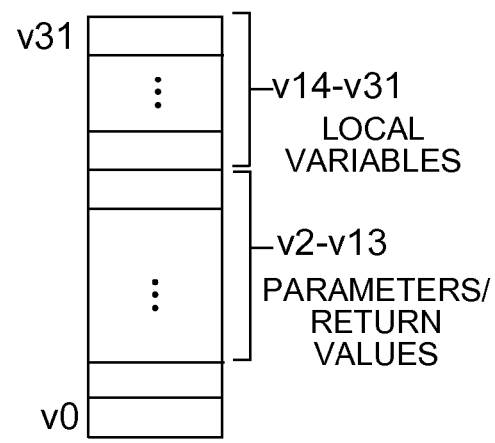

The computing device 200 may contain one or more general-purpose programmable central processing units (CPUs) 202A and 202B, herein generically referred to as the processor 202. In an embodiment, the computing device 200 may contain multiple processors; however, in another embodiment, the computing device 200 may alternatively be a single CPU device. Each processor 202 executes instructions stored in the memory 204 and may include one or more levels of on-board cache. In addition, each processor 202 includes various registers. In the example of FIG. 3, the CPU 202A includes a set of registers REGA and the CPU 202B includes a set of registers REGB. Both sets of registers REGA and REGB may include GPRs r0-r31. In addition, both REGA and REGB may include floating point registers (FPR) f0-f31 and vector registers (VR) v0-v31. As shown in FIG. 4, registers r3-r10 of GPRs r0-r31 may be used for parameters and return values, and registers r14-r31 may be used for local variables. In addition, registers f1-f13 of floating point registers f0-f31 may be used for parameters and return values, and registers f14-f31 may be used for local variables. Further, registers v2-v13 of vector registers v0-v31 may be used for parameters and return values, and registers v14-v31 may be used for local variables.

In an embodiment, the memory 204 may include a random-access semiconductor memory, storage device, or storage medium (either volatile or non-volatile) for storing or encoding data and programs. In another embodiment, the memory 204 represents the entire virtual memory of the computing device 200, and may also include the virtual memory of other computer systems coupled to the computing device 200 or connected via a network 220. The memory 204 is conceptually a single monolithic entity, but in other embodiments the memory 204 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 204 may store all or a portion of the components and data shown in FIG. 3. The memory 204 may store a compiler 240, a first module 242, a second module 244, and a stack 246. In one example, the first module 242 may be source code and the second module 244 may be object code. In another example, the first module 242 may be a user application and the second module 244 may be a shared library. Any number of modules of any type may be stored in the memory 204. The stack 246 may store one or more stack frames, such as the stack frame 100. These programs and data structures are illustrated in FIG. 3 as being included within the memory 204 in the computing device 200, however, in other embodiments, some or all of them may be on different computer systems and may be accessed remotely, e.g., via a network 120. The computing device 200 may use virtual addressing mechanisms that allow the programs of the computing device 200 to behave as if they only have access to a large, single storage entity instead of access to multiple, smaller storage entities. Thus, while the components and data shown in FIG. 3 are illustrated as being included within the memory 204, these components and data are not necessarily all completely contained in the same storage device at the same time. Further, although the components and data shown in FIG. 3 are illustrated as being separate entities, in other embodiments some of them, portions of some of them, or all of them may be packaged together.

In an embodiment, the components and data shown in FIG. 3 may include instructions or statements that execute on the processor 202 or instructions or statements that are interpreted by instructions or statements that execute on the processor 202 to carry out the functions as further described below. In another embodiment, the components shown in FIG. 3 may be implemented in hardware via semiconductor devices, chips, logical gates, circuits, circuit cards, and/or other physical hardware devices in lieu of, or in addition to, a processor-based system. In various embodiments, the components shown in FIG. 3 may include data in addition to instructions or statements.

Still referring to FIG. 3, the computing device 200 may include a bus interface unit 209 to handle communications among the processor 202, the memory 204, a display system 224, and the I/O bus interface unit 210. The I/O bus interface unit 210 may be coupled with the I/O bus 208 for transferring data to and from the various I/O units. The I/O bus interface unit 210 communicates with multiple I/O interface units 212, 214, 216, and 218, which are also known as I/O processors (IOPs) or I/O adapters (IOAs), through the I/O bus 208. The display system 224 may include a display controller, a display memory, or both. The display controller may provide video, audio, or both types of data to a display device 226. The display memory may be a dedicated memory for buffering video data. The display system 224 may be coupled with a display device 226, such as a standalone display screen, computer monitor, television, or a tablet or handheld device display. In an embodiment, the display device 226 may include one or more speakers for rendering audio. Alternatively, one or more speakers for rendering audio may be coupled with an I/O interface unit. In alternate embodiments, one or more of the functions provided by the display system 224 may be on board an integrated circuit that also includes the processor 202. In addition, one or more of the functions provided by the bus interface unit 209 may be on board an integrated circuit that also includes the processor 202.

The I/O interface units support communication with a variety of storage and I/O devices. For example, the terminal interface unit 212 supports the attachment of one or more user I/O devices 220, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 220 and the computing device 200, and may receive output data via the user output devices. For example, a user interface may be presented via the user I/O device 220 or display device 226, such as displayed on a display device, played via a speaker, or printed via a printer.

The storage interface 214 supports the attachment of one or more disk drives or direct access storage devices 222 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 222 may be implemented via any type of secondary storage device. The contents of the memory 204, or any portion thereof, may be stored to and retrieved from the storage device 222 as needed. The I/O device interface 216 provides an interface to any of various other I/O devices or devices of other types, such as printers or fax machines. The network interface 218 provides one or more communication paths from the computing device 200 to other digital devices and computer systems; these communication paths may include, e.g., one or more networks 120.

Although the computing device 200 shown in FIG. 3 illustrates a particular bus structure providing a direct communication path among the processors 202, the memory 204, the bus interface 209, the display system 224, and the I/O bus interface unit 210, in alternative embodiments the computing device 200 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 200 may, in fact, contain multiple I/O bus interface units 210 and/or multiple I/O buses 208. While multiple I/O interface units are shown, which separate the I/O bus 208 from various communications paths running to the various I/O devices, in other embodiments, some or all of the I/O devices are connected directly to one or more system I/O buses.

In various embodiments, the computing device 200 is a multi-user mainframe computer system, a single-user system, or a server computer or similar device that has little or no direct user interface, but receives requests from other computer systems (clients). In other embodiments, the computing device 200 may be implemented as a desktop computer, portable computer, laptop or notebook computer, tablet computer, pocket computer, telephone, smart phone, or any other suitable type of electronic device.

FIG. 3 is intended to depict the representative major components of the computing device 200. Individual components, however, may have greater complexity than represented in FIG. 3, components other than or in addition to those shown in FIG. 3 may be present, and the number, type, and configuration of such components may vary. Several particular examples of additional complexity or additional variations are disclosed herein; these are by way of example only and are not necessarily the only such variations. The various program components illustrated in FIG. 3 may be implemented, in various embodiments, in a number of different manners, including using various computer applications, routines, components, programs, objects, modules, data structures, etc., which may be referred to herein as "software," "computer programs," or simply "programs."

In various aspects, embodiments may provide a calling convention that combines: simple argument passing in registers for normal functions, efficient argument passing for variadic functions, and correct argument passing for unprototyped (not fully declared) functions while using less memory for stack space than known ABIs by only allocating a register save area for a called function when it is needed.

Many data types are known. Examples include Boolean, character, enumeration, integral, pointer, floating and vector data types. There are various subcategories within these categories, such as short int and double float. In accordance with various embodiments, each data type is associated with a register passing prototype. However, to avoid obscuring the examples in this description, this description will focus on the register passing prototypes for a few representative data types. It should be understood that all known data types may be processed according to the disclosed embodiments. In addition, with respect to the discussion of natural registers for data types, integral data types are referred to as representative of a natural data type that may be passed in GPRs. However, it should be understood that various other data types be designated as having GPRs as their natural register.

It is generally more efficient to pass arguments to called functions in registers than to construct an argument list in storage or to push them onto the stack. Since all computations must be performed in registers anyway, memory traffic can be eliminated if the caller can compute arguments into registers and pass them in the same registers to the called function, where the called function can then use them for computation in the same registers. Of course, the number of registers in a processor naturally limits the number of arguments that can be passed in registers.

A function prototype lists parameters in a particular sequence. For example, in the function void func1 (int x, float y, int z, float w), the parameters x, y, z, and w are listed in a particular sequence. This sequence is referred to herein as the parameter or argument sequence of the function call. In addition, there may be a sequence for the type of parameter in a function call. In the example, the parameters x and z form a sequence of integral type parameters and the parameters y and w form a sequence of floating point type parameters.

According to various embodiments, "natural" registers for passing parameters of floating point data type are FPRs f1-f13. Floating point parameters are passed in FPRs according to their position in the sequence of floating point parameters in the function call. In addition, in those circumstances when not all floating point parameters are passed in registers, the "natural" memory locations for passing parameters of the floating point data type is the parameter overflow area 108. Floating point parameters are passed in the next available location in the parameter overflow area 108 in accordance with the position of the floating point parameter in the parameter sequence of the function call (i.e., including non-floating point parameters). For instance, a first floating point parameter may be passed in FPR f1, a second floating point parameter may be passed in FPR f2, a third floating point parameter may be passed in FPR f3, and so forth, until the floating point registers are exhausted. The next floating point parameter is then passed in the next available in-memory location in the parameter overflow area 108, in accordance with the position of the floating point parameter in the parameter sequence of the function call (i.e., including non-floating point parameters).

According to various embodiments, "natural" registers for passing parameters of vector data type are VRs v2-v13. In addition, in those circumstances when not all vector parameters are passed in registers, the "natural" memory locations for passing parameters of vector data type is the parameter overflow area 108 in accordance with the position of the vector parameter in the parameter sequence of the function call (i.e., including non-vector parameters). For instance, a first vector parameter may be passed in VR v2, a second vector parameter may be passed in VR v3, a third vector parameter may be passed in VR v4, and so forth, until the vector parameter registers are exhausted. The next vector parameter is then passed in the next available in-memory location in the parameter overflow area 108, in accordance with the position of the vector parameter in the parameter sequence of the function call (i.e., including non-vector parameters).

According to various embodiments, "natural" registers for passing parameters of integral data type are GPRs r3-r10. In addition, in those circumstances when not all integral data type parameters are passed in registers, the "natural" memory locations for passing parameters of integral data type is the parameter overflow area 108. However, certain rules apply to the use of GPRs. When a parameter of integral type is to be passed in a GPR, it is passed in the GPR corresponding to its position in the parameter or argument sequence of the function call, which includes any floating point or vector parameters specified in the function call. When a floating point or vector parameter is present in a function call, one or more GPRs corresponding to the position of the parameter in the parameter sequence of the function call is not used for passing an integral type parameter. (Some floating point parameters fit in one GPR but some need two GPRS and all vector parameters need two GPRs.) For example, assume that the parameter sequence of a function call is (int x, float y). The integer parameter x, which is the first parameter in the parameter sequence, is passed in the first GPR r3. As a second example, assume that the parameter sequence of a function call is (float x, int y). The first integer parameter y follows the floating point parameter x in the parameter sequence of the function call. The first integer parameter y, which follows the first parameter in the parameter sequence of the function call, is passed in the second GPR r4, skipping the first GPR r3. When this scheme is followed and the GPRs are exhausted, the next integral parameter is passed in the next available in-memory location in the parameter overflow area 108, in accordance with the position of the integral parameter in the parameter sequence of the function call (i.e., including non-integral parameters).

According to various embodiments, structures are passed in GPRs or corresponding type-dependent register types for a set of well-defined structures. Parameters of type float and double are to be passed in their natural registers, i.e., f1-f13. Vector data types are to be passed in their natural registers, i.e., v2-v13.

Generally, a function prototype declares all of the parameters that are used in a function call. The parameters declared in a function prototype are referred to herein as "named parameters." However, a variadic or "vararg" function may be called with more arguments than parameters. When a function has more arguments than parameters, the arguments that do not correspond to a named parameter are referred to herein as "unnamed" parameters. Consider the variadic function prototype: void func2 (int x, float y, . . . ). In a first example, a function call that calls this function is func2 (x, y). In the first example, x and y are named parameters. In a second example, a function call that calls the function is func2 (x, y, z). In the second example, x and y are named parameters, while z is an unnamed parameter.

In the some programming languages, such as the C language, a first function (a "caller") can include a function call to a second function in the absence of a prototype for a second function (a "callee"). This aspect of the C language was introduced early in the history of the language. While omitting a prototype for a second function in a first function that calls the second function is presently discouraged, there is legacy code in existence in which callee function prototypes are missing in the caller. An ABI that requires prototypes in a caller for all called functions would be incompatible with legacy code. As mentioned, it may be important for a new ABI to support features of legacy ABIs and programming languages.

One aspect of portions of software code that include a function call but do not include a prototype for the called function is that a compiler cannot determine whether a parameter in the function call is a named or unnamed parameter. Consider three function calls: func1 (a, b, c), func2 (x, y), and func2 (x, y, z). Assume the code that includes these function calls does not include a prototype for either function. Assume that function func1 is not variadic while func2 is variadic. In the first function call, because the compiler is unable to determine that func1 is not variadic, it is unable to determine whether a, b, or c are named or unnamed parameters. In second and third function calls, the compiler is again unable to determine whether x, y, or z are named or unnamed parameters. Even if the compiler were able to determine that func2 is variadic, it is unable to determine which parameters are named and which are unnamed without a prototype for the function.

Figure 5:
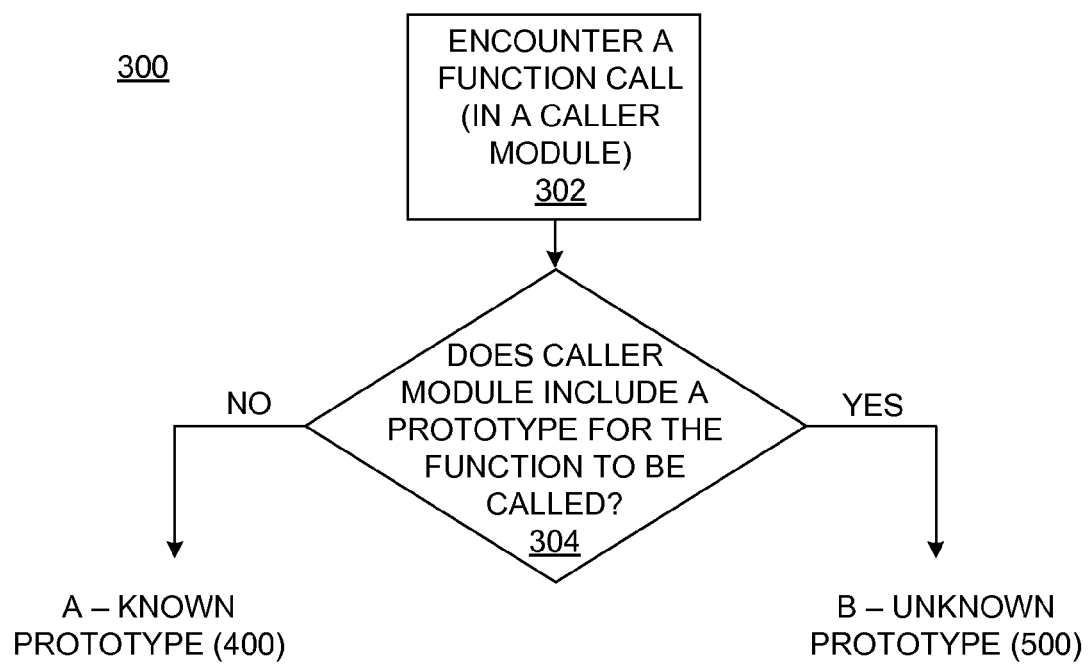
FIG. 5 shows a method for a compiler to generate instructions for a function call in accordance with various embodiments.

FIG. 5 shows a method 300 for compiler to generate instructions for a function call (a "caller") that calls a function (a "callee") in accordance with various embodiments. The method 300 may be compatible with legacy code in which callee function prototypes are missing in a caller. In accordance with the method 300 for a caller, when a compiler encounters caller function (operation 302) when compiling a source code module, it determines (operation 304) whether the caller includes a fully prototyped declaration for the function to be called. If the called function is declared with a full prototype, a method 400 for a call with a (A) known prototype is invoked. Otherwise, when a prototype is not declared, a method 500 for a call with (B) an unknown prototype is invoked.

Figure 6:
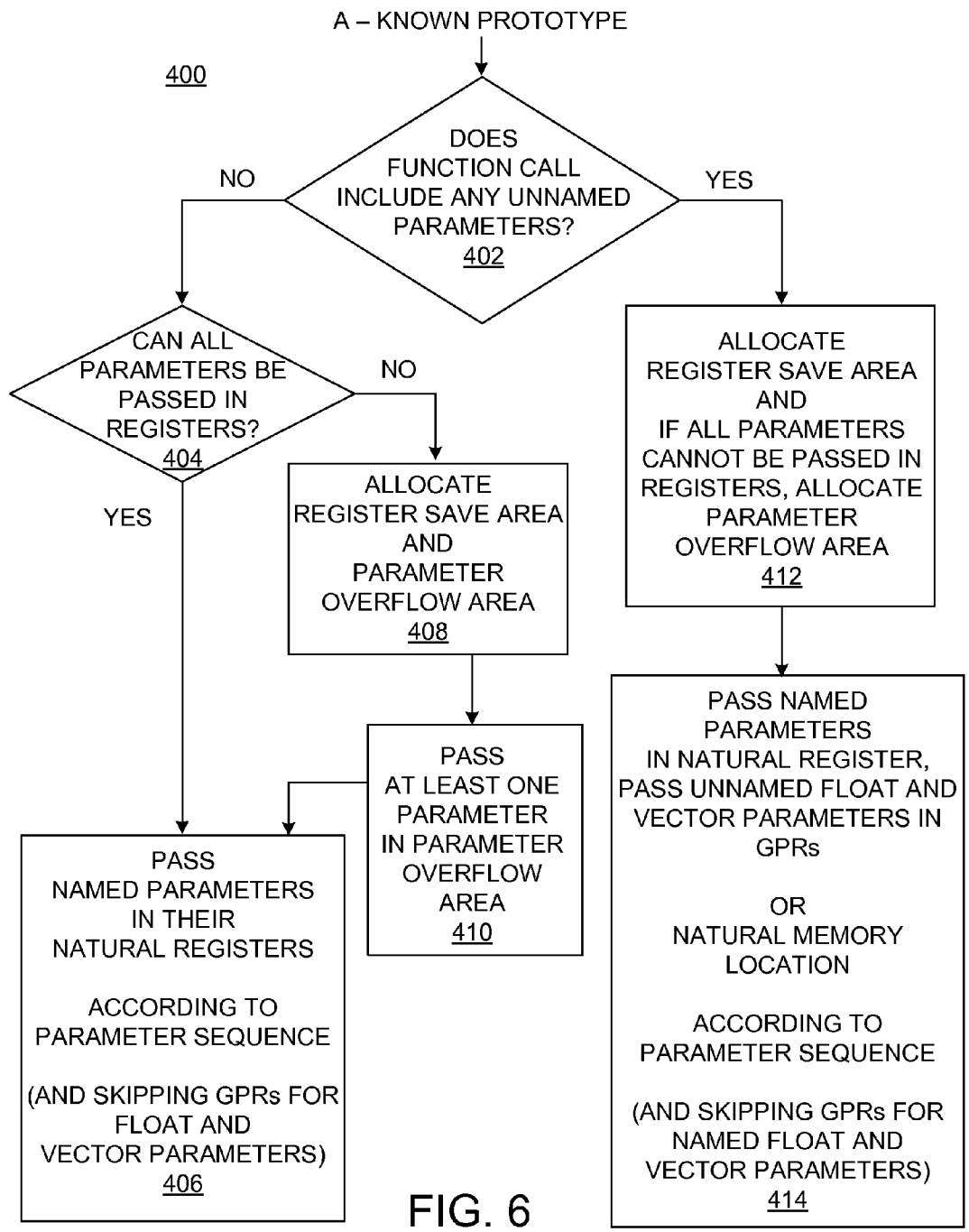
FIG. 6 shows a method for a compiler to generate instructions for a function call when the prototype of the called function is known, according to various embodiments.

FIG. 6 shows a method 400 for a function call where the compiler "knows" the prototype of the called function, i.e., the prototype is within scope of the code portion being compiled. (It should be understood that if an argument in the function call is of a type that does not correspond to the type specified in the function prototype, the argument is first converted or promoted to the specified type.) In operation 402, it is determined whether the callee function includes any unnamed parameters. If the callee is not variadic or if the callee is variadic, but the only parameters specified in the function call are named, then there are no unnamed parameters, and the method moves to operation 404. Otherwise, the method moves to operation 412.

In operation 404, it is determined whether all parameters can be passed in registers. If all parameters can be passed in registers, the method moves to operation 406. If one or more parameters cannot be passed in registers, the method moves to operation 408. In operation 408, instructions are inserted in object code to allocate a register save area 106 and a parameter overflow area, and the method moves to operation 410. In operation 410, at least one parameter is passed in the parameter overflow area 108. The method moves from operation 410 to operation 406. In operation 406, instructions are inserted in object code to pass all named parameters corresponding to arguments that correspond to parameter registers in their natural registers.

In operation 406, any floating point parameters are passed in FPRs according to a sequence of floating point parameters in the function call. Similarly, any vector parameters are passed in VRs according to a sequence of vector parameters in the function call. For example, consider the function void func4 (int x, float y, int z, float w). The floating point parameter sequence is y, w. Parameter y is passed in FPR f1 and w is passed in FPR f2, even though y and w are in the second and fourth positions of the parameter sequence of the function call.

In contrast, in operation 406, integral type parameters are passed in GPRs according to a parameter sequence of the function call, not according to a parameter sequence of integral parameters. Continuing the example of void func4 (int x, float y, int z, float w), parameter x is passed in GPR r3 and z is passed in GPR r5. When integral type parameters are passed in GPRs according to the parameter sequence of the function call and the parameter sequence includes floating point or vector data types, particular GPRs may be skipped. In this example, GPR r4 is skipped. The GPR r4 corresponds to the second parameter in the parameter sequence of the function, which in this example is a floating point type parameter. The parameter z, which is the second integral parameter, but the third parameter in the function call, is placed in the third GPR.

In operation 410, at least one parameter is passed in the parameter overflow area 108. The at least one parameter may be a floating point, vector, or integral parameter.

In operation 412, the callee is variadic and at least one parameter specified in the function call is unnamed. Under these conditions, instructions are inserted in object code to allocate a register save area 106. In addition, if all parameters cannot be passed in registers, instructions are inserted in object code to allocate a parameter overflow area 108. The method moves to operation 414.

In operation 414, named parameters are passed in their natural register in the same manner as operation 406. For named parameters of type float or vector, one or more GPRs corresponding to the sequential position of the named float or vector parameter is skipped. However, for unnamed parameters of type float or vector, a parameter is passed in one or more GPRs corresponding to the sequential position of the unnamed float or vector parameter. When all parameters are not passed in registers, a parameter not passed in a register is passed in the parameter overflow area 108.

Figure 7:
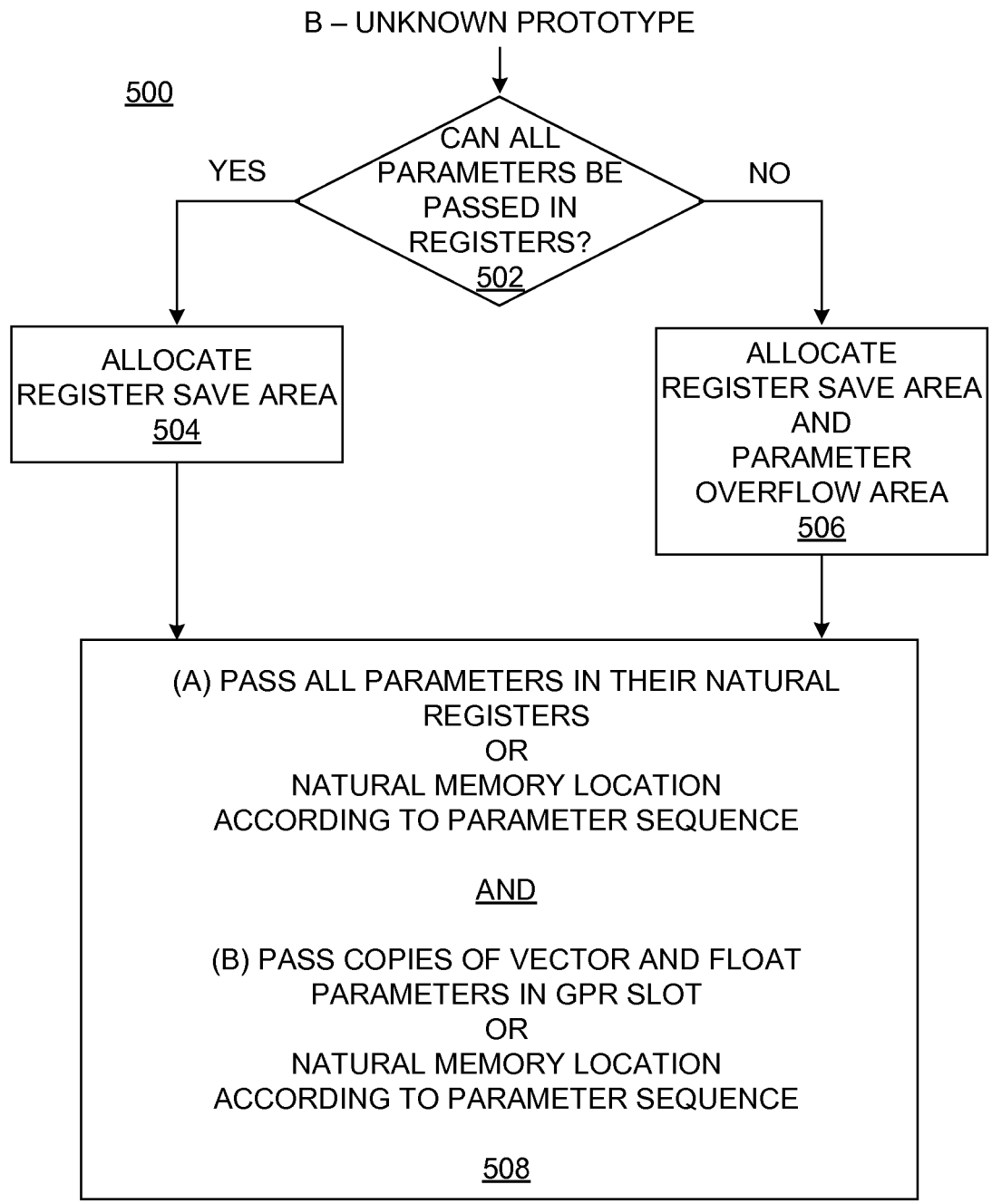
FIG. 7 shows a method for a compiler to generate instructions for a function call when the prototype of the called function is unknown, according to various embodiments.

FIG. 7 shows a method 500 for a function call where the prototype of the called function is "unknown" to the compiler, i.e., the prototype is not within scope of the code portion being compiled. (It should be understood that arguments in the function call may first be converted or promoted to conform to various conventions.) In operation 502, it is determined whether all parameters can be passed in registers. If all parameters can be passed in registers, the method moves to operation 504. If one or more parameters cannot be passed in registers, the method moves to operation 506.

In operation 504, instructions are inserted in object code to allocate a register save area 106. In operation 506, instructions are inserted in object code to allocate a register save area 106 and a parameter overflow area 108. Following both operations, the method moves to operation 508.

Operation 508 may be understood as having two parts, even though the operation may be a single operation. In operation 508 (A), all parameters are passed in their natural registers according to parameter sequence. Referring back to operations 406, 410 (for named parameters) and operation 414 (for named and unnamed parameters), named parameters are passed in their natural register. Operation 508 (A) is similar to these operations 406, 410, and 414 in that all parameters are treated as though they were named parameters in operation 508. All parameters are passed in their natural register or natural memory location in operation 508, as if they were a named parameter in operations 406, 410, and 414. In operation 508 (B), floating point and vector parameters are additionally passed in a slot in the GPRs or in their natural memory locations according to parameter sequence of the function. Operation 508 (B) is similar to operation 414 in that unnamed floating point and vector parameters are passed in one or more GPRs. In other words, floating point and vector parameters may be passed twice—once in their natural register and once in one or more GPRs or a natural memory location.

Figure 8:
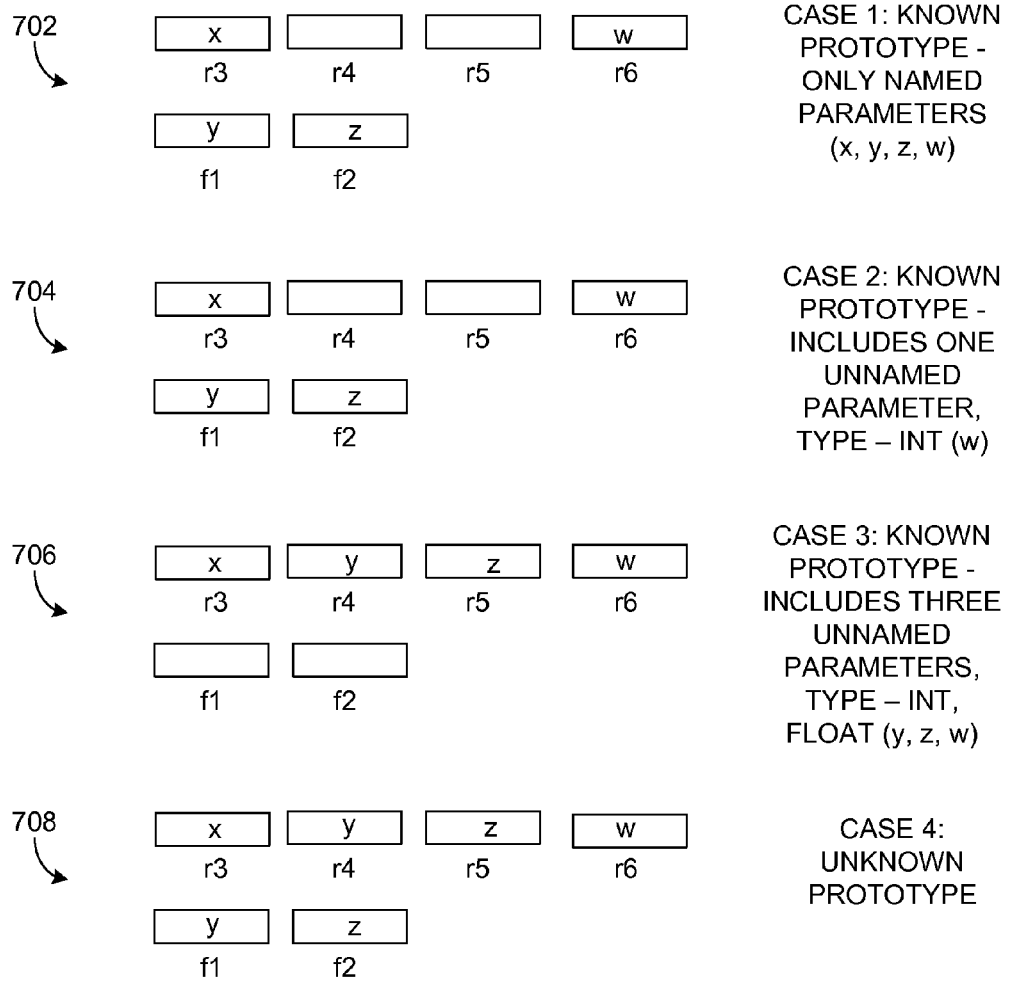
FIG. 8 depicts examples intended to illustrate various methods for a compiler to generate instructions for a function call, according to various embodiments.

To further illustrate, the methods 300, 400, and 500, FIG. 8 depicts several examples.

Reference number 702 is for a case 1 where the prototype of the called function is known to the compiler and all of the parameters are named. In case 1, x, y, z, and w are all named parameters of a function having a prototype: "void func1(int x, float y, float z, int w);". Case 1 corresponds to a condition in which the method 400 reaches operation 406. Parameter x is first in the parameter sequence of the function. Parameter x is passed in the first GPR, r3. Parameter y is second in the parameter sequence of the function and first in the sequence of floating point parameters. Parameter y is passed in the first FPR, f1. The GPR for the second parameter in the parameter sequence of the function is skipped. Parameter z is third in the parameter sequence of the function and second in the sequence of floating point parameters. Parameter z is passed in the second FPR, f2. The GPR for the third parameter in the parameter sequence of the function is skipped. Parameter w is fourth in the parameter sequence of the function. Parameter w is passed in the fourth GPR, r6.

Reference number 704 is for a case 2. In case 2, x, y, and z are named parameters of a function having a prototype: "void func1(int x, float y, float z, . . . );". In case 2, w is an unnamed parameter. Case 2 corresponds to a condition in which the method 400 reaches operation 414. In case 2, parameters are passed in a manner identical to case 1.

Reference number 706 is for a case 3. In case 3, x is a named parameters and y, z, and w are unnamed parameters of a function having a prototype: "void func1(int x, . . . );". Case 3 corresponds to a condition in which the method 400 reaches operation 414, but the parameters y, z, and w are unnamed parameters of type floating point. Parameter x is first in the parameter sequence of the function. Parameter x is passed in the first GPR, r3. Parameter y is second in the parameter sequence of the function and first in the sequence of floating point parameters. Parameter y is passed in the second GPR, r4. Parameter z is third in the parameter sequence of the function and second in the sequence of floating point parameters. Parameter z is passed in the third GPR, r5. Parameter w is fourth in the parameter sequence of the function. Parameter w is passed in the fourth GPR, r6.

Reference number 708 is for a case 4. In case 4, it is not known whether the parameters are named or unnamed, i.e., the function has been declared as "func1( );" or has not been declared (i.e., an implicit declaration of a function). Case 4 corresponds to a condition in which the method 500 reaches operation 508. Parameters x, y, z, and w are passed in GPRs according to their sequential position in the function call. In addition, floating point type parameters y and z are passed in FPRs according to their sequential position in the sequence of floating point parameters.

Figure 9:
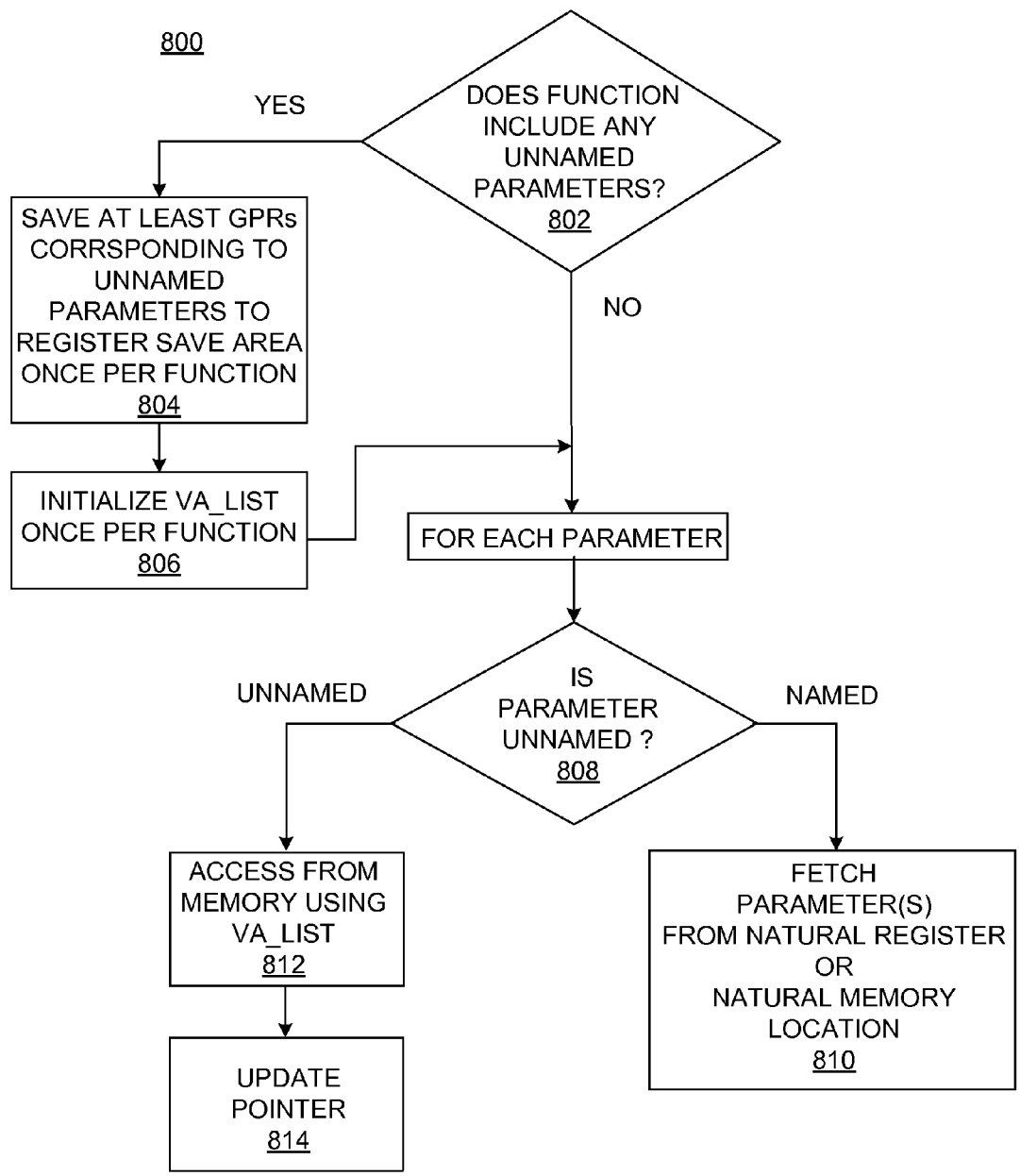
FIG. 9 shows a method for a compiler to generate instructions for a callee function in accordance with various embodiments.

FIG. 9 shows a method 800 for compiler to generate instructions for a callee function in accordance with various embodiments. The method 800 is somewhat simplified in comparison to a real world example in that it assumes that the callee function employs a single variable of the type va_list. In practice, a single callee function may employ multiple different variables of the va_type list. Depending on the algorithm implemented by the callee function, parameters may be accessed multiple times or not at all, or a list of unnamed parameters may be walked multiple times. The prototype of the callee function is known to the compiler. The compiler inserts instructions in object code to perform the operations described in the method 800. In operation 802, it is determined whether the function includes any unnamed parameters. In various embodiments, if a function contains an instance of the va_start command, it may be determined to include unnamed parameters. If the function does not include any unnamed parameters, the method moves to operation 808. If the function includes one or more unnamed parameters, the method moves to operation 804. In operation 804, each parameter stored in a GPR is fetched and saved to the register save area 106. In various embodiments, in operation 804, at least the unnamed parameters are saved from their respective GPR locations to corresponding locations in the register save area and the saving of unnamed parameters may be performed without regard to the number of va_list variables that may have been declared. The operation 804 is generally performed just one time per function call. The method advances to operation 806, where a va_list pointer, e.g., ap, is initialized to point to the parameter stored at SP+32. In contrast to operation 804, the operation 806 may be performed multiple times per function call, depending on the particular called function, e.g., whether the called function uses more than one variable of the va_list type. From operation 806 the method moves to operation 808.

Operations 808-814 are performed for each parameter. The operations 808-814 may be performed each time a parameter is accessed. In operation 808, it is determined whether the particular parameter is named or unnamed. If the parameter is named, the method advances to operation 810. In operation 810, the parameter is fetched from its natural register or its natural memory location according to parameter sequence of the function and parameter sequence of the variable type. Operation 810 is similar to the above-described operation 406, except that operation 406 is concerned with passing parameters and operation 810 is concerned with accessing parameters once they have been passed.

In operation 812, an unnamed parameter is accessed from a stack frame 100. A pointer ap may point to the parameter. In operation 814, the pointer is updated to point to the next parameter. One example implementation of the operations 812-814 employs the following macro. A va_arg macro has two arguments: the va_list being operated on and the type of the next argument. Assume the va_list is called "ap" and the type is called "type", then a va_arg (ap, type) may be implemented as: *(type *) ((ap+=round_sizeof(type)), (ap−round_sizeof(type))).

More particularly, as shown by the exemplary implementation of va_arg( ) above, an update in accordance with embodiments of the present invention does not differentiate between parameters having been passed in parameter registers (and that have been spilled to memory by step 804) and those having been passed in memory. Furthermore, in accordance with embodiments of the present invention, it is not necessary to prevent a parameter from spanning the register parameters and the memory parameter area by having to identify such cases and include logic in both the parameter handling logic of the compiler, as well as the parameter handling logic corresponding to va_arg. Rather, it is possible to pass such parameters partly in registers and partly in memory, and a va_arg( ) access may refer to such a parameter having been passed partially in registers and partially in memory without any special handling logic. In accordance with embodiments of the present invention, this is possible because the caller has allocated a register save area that enables the saving of register parameters in a contiguous manner to any memory parameters. In yet another advantageous aspect of embodiments of the present invention, the memory overhead of a register save area is avoided for most function calls, in particular for those function calls that have been properly declared with prototypes in accordance with modern programming practice and programming language standards, such as those published by ANSI and ISO.

The method 800 may be further explained by referring back to the examples of FIG. 8. In case 1, 702, x, y, z, and w are named and will be fetched in operation 810 from r3, f1, f2, and r6, respectively. In case 2, 704, x, y, and z are named and will be fetched in operation 810 from r3, f1, and f2, respectively. The unnamed parameter w will be fetched from the register save area 106 of the stack frame 100 in operation 812. In case 3, 706, x is named and fetched from r3 in operation 810. The unnamed parameters y, z, and w will be fetched from the register save area 106 of the stack frame 100 in operation 812. In case 4, 708, the compiler did not know at the point of the function call which parameters were named and which were unnamed. At the callee function, the compiler knows which parameters are named and unnamed. First, assume that all of the parameters x, y, z, and w are unnamed. The parameters x, y, z, and w will accessed will be fetched from the register save area 106 of the stack frame 100 in operation 812. Next assume that the parameters x and z are unnamed and the parameters y and w are named. The unnamed parameters x and z will be fetched from the register save area 106 in operation 812. The named parameters y and w will be fetched from their natural registers f1 and r6, respectively, in operation 810.

Referring now to step 804, in various embodiments, the saving of at least the unnamed parameters from their respective GPR locations to corresponding locations in the register save area may be performed without regard to the number of va_list variables that may have been declared.

Assigning Memory Addresses to Input Parameters

As described above, it is generally desirable to pass parameters to called functions in registers. However, in some languages, the called function may need to obtain the address of one or more input parameters. In the C programming language, the unary operator & takes the address of its operand. For example, the statement "p=&c;" takes the address of c and assigns it to p. In other languages, references to an address of an input parameter are implicitly created by language features, such as by-reference passing.

The unary & operator cannot be applied to "register variables." A register variable is a variable stored in a register. Parameters passed to a callee function in a register, e.g., a GPR, FPR, or VR are examples of register variables. In order to allow a callee function to obtain an address of one of its input parameters that is stored in a register, the input parameter must be first saved to a memory location.

One approach for allowing a callee function to obtain an address of an input parameter is to require a caller to allocate memory locations for all parameters it passes in registers to a callee function and then save all of the parameters passed in registers in the allocated memory locations. For example, fixed locations in the register save area of the caller's frame could always be allocated by a caller for all of the parameters passed to a function. However, as described above, it may be desirable to conserve stack space and this approach may result in a significant amount of allocated, but unused, stack space. In another approach, all input parameters passed in registers may be saved by the callee to the callee's local stack frame. However, this approach can result in duplicate memory locations being allocated for register variables. As described above, a caller allocates memory locations for variables passed in registers in certain cases, e.g., a register save area is allocated by a caller for functions with unknown prototypes or known prototypes with unnamed parameters. Memory allocated by a callee to save register parameters would duplicate the register save area allocated by the caller in these cases, which may result in more stack space being allocated than is required.

According to various embodiments, a "home location" is determined or allocated for each register variable, i.e., a parameter passed in a register in a function call. An address in memory of a variable is deemed to be its home location. When the address of a variable is taken, e.g., by the unary & operator, the address is the home location of the variable.

Figure 10:
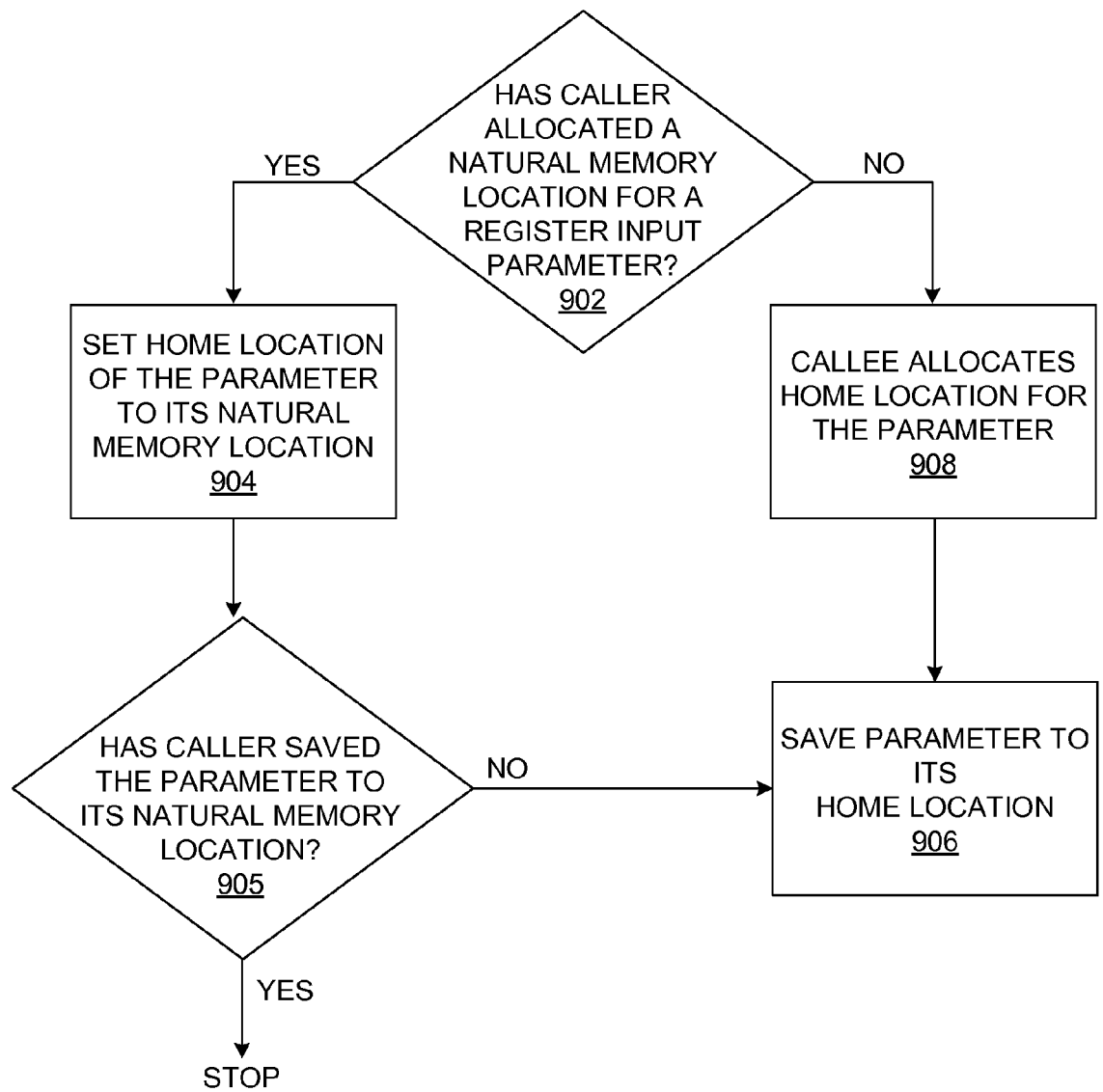
FIG. 10 shows a method for compiler to generate instructions for a callee function in accordance with various embodiments.

FIG. 10 shows a method 900 to generate instructions for a callee function in accordance with various embodiments. The method 900 may be performed by a compiler inserting instruction in various locations in object code. In some cases, the instructions may be provided in source code. The method 900 may be used to assign "home" memory addresses to input parameters passed in registers in a function call to a callee function. The method 900 shows general operations that may be performed and one example of a sequence for performing the operations for a single parameter. As described below, the method 900 may be adapted to perform the operations 902-906 in variety of different ways.

According to various embodiments, it is determined, in operation 902, whether the caller has allocated a natural memory location for a register parameter. The operation 902 may make this determination when the callee function is compiled by determining whether the prototype for the callee function declares any unnamed parameters, determining whether named parameters are of a number and type such that all of the named parameters are capable of being passed in registers, and using the rules employed by the compiler when the caller function was compiled. When compiling the callee function, the compiler always knows the number and types of named parameters and always knows whether unnamed parameters are used. (However, the compiler does not know number/types of unnamed parameters.) These are specified as part of the function definition of the callee function being compiled.

If the compiler determines in operation 902 that the callee only uses named parameters and that the named parameters are of a number and type such that all of the named parameters are capable of being passed in registers, then if it is assumed that the prototype was in scope when the caller was compiled, the compiler knows that the caller did not allocate any memory for the parameters. This case corresponds with determining in operation 404 of the method 400 that all parameters can be passed in registers and operation 406. Accordingly, the callee needs to allocate a home memory location for a named parameter in this case and under this assumption that the prototype was known to the caller.

If the compiler determines in operation 902 that the callee only uses named parameters and that the named parameters are of a number and type such that all of the named parameters are not capable of being passed in registers, then if it is assumed that the prototype was in scope when the caller was compiled, the compiler knows that the caller allocated a register save area and a parameter overflow area. This case corresponds with determining in operation 404 of the method 400 that all parameters cannot be passed in registers and operation 408. Accordingly, the callee does not need to allocate a home memory location for a named parameter in this case and under this assumption that the prototype was known to the caller.

If the compiler determines in operation 902 that the callee only uses named parameters and it is assumed that the prototype was not known to the caller, then the compiler knows, when compiling the callee, that the caller allocated at least a register save area. This case corresponds with operation 504 of the method 500. In addition, if the compiler determines that the named parameters are of a number and type such that all of the named parameters are not capable of being passed in registers, the compiler knows that the caller would have allocated both a register save area and a parameter overflow area. This case corresponds with operation 506 of the method 500. Accordingly, the callee does not need to allocate a home memory location for a named parameter in this case and under this assumption that the prototype was not known to the caller.

If the compiler determines in operation 902 that the callee uses at least one unnamed parameter and it is assumed that the prototype was known to the caller, then the compiler knows, when compiling the callee, that the caller allocated at least a register save area. In addition, if the compiler determines that the named parameters are of a number and type such that all of the named parameters are not capable of being passed in registers, the compiler knows that the caller would have allocated both a register save area and a parameter overflow area. These cases correspond with operation 412 of the method 400. If the named parameters are of a number and type such that all of the named parameters are not capable of being passed in registers, then all of the parameters are not capable of being passed in registers. Accordingly, the callee does not need to allocate a home memory location for a named parameter in this case and under this assumption that the prototype was not known to the caller.

If the compiler determines in operation 902 that the callee uses at least one unnamed parameter and it is assumed that the prototype was not known to the caller, then the compiler knows, when compiling the callee, that the caller allocated at least a register save area. This case corresponds with operation 504 of the method 500. In addition, if the compiler determines that the named parameters are of a number and type such that all of the named parameters are not capable of being passed in registers, the compiler knows that the caller would have allocated both a register save area and a parameter overflow area. This case corresponds with operation 506 of the method 500. If the named parameters are of a number and type such that all of the named parameters are not capable of being passed in registers, then all of the parameters are not capable of being passed in registers. Accordingly, the callee does not need to allocate a home memory location for a named parameter in this case and under this assumption that the prototype was not known to the caller.

To summarize, if the compiler determines the callee function includes only named parameters and determines that named parameters are of a number and type such that all of the named parameters are capable of being passed in registers, instructions must be inserted into the callee to allocate a register save area 106. Otherwise, the compiler can assume that at least a register save are would have been allocated by the caller and the callee need not allocate a register save area 106. In addition, if the named parameters are of a number and type such that all of the named parameters are not capable of being passed in registers, the compiler can assume that a parameter overflow area would have been allocated by the caller and the callee need not allocate a register save area 106 or a parameter overflow area 108.

If it is determined in operation 902 that the caller has allocated a natural memory location for the register parameter(s), the natural memory location(s) provided by the caller may be used or "set" as the home memory location(s) for the register parameter(s) in operation 904.

In operation 905, it may be determined whether the caller has saved one or more parameter(s) to its (their) natural memory location. The operation 905 may make this determination using logic similar to that described for determining whether the caller would have allocated a memory location for parameters. When parameters are of a number and type such that all of the named parameters are capable of being passed in registers, then the caller would not have saved parameters passed in registers to memory. Otherwise, when parameters are of a number and type such that all of the parameters are not capable of being passed in registers, then the caller would save those parameters that were not passed in registers to memory. Accordingly, the compiler may need to insert instructions in the callee to save a parameter passed in a register to memory.

If a parameter has not been saved by the caller, the register parameter may be saved to its home memory location in operation 906 prior to any address-based reference to the parameter. Operation 906 may be performed by compiler-inserted instructions in a callee.

If it is determined that the caller has not provided a natural memory location for the parameter passed in a register to the callee, the callee allocates a home location for the register parameter in operation 908. A parameter passed in a register may be saved to a home memory location allocated by the callee in operation 906 prior to any address-based reference to the parameter. The callee may allocate a home memory location for the register in any desired memory location. In various embodiments, the callee may allocate a home memory location for the register input parameter in its own stack frame, such as in the local variable save area 111 of optional area for callee use 109 (see FIG. 1).

In various embodiments, the method 900 may be invoked when a function is called. In various other embodiments, the method 900 may be invoked in response to a need to obtain the address of one or more input parameters, e.g., an instruction that takes an address of an operand.

The method 900 is described with respect to a single register parameter. In various embodiments, the method may be performed repeatedly for each register input parameters associated with a function call. In other embodiments, the method 900 may be modified so that it is performed once, but the various operations are performed for all register input parameters associated with a function call.

In various embodiments, when a use of an address for a particular register parameter is encountered, the operation 908, in which a home location is allocated by the caller, may be performed individually for the particular register parameter. In other embodiments, when a use of an address for a particular register parameter is encountered, the operation 908 may be performed for all of register input parameters associated with a function call.

In various embodiments, when a use of an address for a particular register parameter is encountered, the operation 906, in which a register parameter is stored in its home location, may be performed individually for the particular register parameter. In various embodiments, when a use of an address for a particular register parameter is encountered, the operation 906 may be performed for all of the register input parameters associated with a function call.

In various embodiments, the method 900 may be invoked for all register input parameters of one or more particular data types, e.g., integral, floating point, vector, etc. In various embodiments, the method 900 may be invoked for all register input parameters of one or more stored in one or more types of registers. For example, when a use of an address for an unnamed parameter stored in a GPR is encountered, all parameters stored in a GPR register are saved to their home locations. The saving of parameters stored in a GPR register to their home locations may be performed in conjunction with an initialization step of the processing of variadic unnamed parameters.

In various embodiments, the method 900 may be invoked when a compiler analyzes an input parameter list of a callee. In various embodiments, the method 900 may be invoked when a compiler determines that a caller has allocated a register save or a register overflow area, or both. In various embodiments, the method 900 may be invoked when a compiler determines that home locations have been allocated in the caller's stack frame. In one embodiment, the presence of a register save area and, optionally, a parameter overflow area is determined by the presence of unnamed parameters as indicated by a prototype. In another embodiment, the presence of a register save area and, optionally, a parameter overflow area is determined by the presence of a va_start indication. In another embodiment, the presence is determined by the presence of at least one parameter having its home location in the parameter overflow area. In another embodiment, the presence is determined by the presence of at least one actual in-memory parameter in a parameter list of a called function. In one embodiment, the presence is determined by a combination of two or more of the above described criteria.

The present invention may be a system, a method, and/or a computer program product. The computer program product may include a computer readable storage medium (or media) having computer readable program instructions thereon for causing a processor to carry out aspects of the aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for allocating memory, comprising:
a processor; and
a memory to store a compiler and one or more modules, the compiler being comprised of instructions that when executed by the processor, cause the processor to perform the following operations:
determining whether a prototype of a callee function is within a scope of a caller, the caller being a module containing a function call to the callee function;
when the prototype of the callee function is not within the scope of the module, inserting instructions in the caller to allocate a register save area in a memory;

when the prototype of the callee function is within the scope of the caller, determining whether the function call includes one or more unnamed parameters;

inserting instructions in the caller to allocate a register save area in a memory when it is determined that the function call includes one or more unnamed parameters;

determining whether all parameters of the function can be passed in registers; and inserting instructions in the caller to allocate a parameter overflow area in the memory when all parameters of the function call cannot be passed in registers.

2. The system of claim 1, wherein the inserting of instructions in the caller to allocate a register save area in a memory when it is determined that the function call includes one or more unnamed parameters further comprises:

determining whether all parameters of the function can be passed in registers; and inserting instructions in the caller to allocate a parameter overflow area in the memory when all parameters of the function call cannot be passed in registers.

3. The system of claim 1, further comprising:

determining whether all parameters of the function can be passed in registers when it is determined that the function call only includes named parameters; and omitting instructions in the caller to allocate a register save area in a memory when all parameters of the function call can be passed in registers.

4. The system of claim 1, further comprising:

determining whether all parameters of the function can be passed in registers when it is determined that the function call only includes named parameters; and inserting instructions in the caller to allocate a register save area and a parameter overflow area in a memory when all parameters of the function call cannot be passed in registers.

5. The system of claim 2, wherein the memory is a stack frame of the caller.

6. A computer program product for allocating memory, comprising a computer readable storage medium having program instructions embodied therewith, the program instructions readable by a processor circuit to cause the processor to:

determine whether a prototype of a callee function is within a scope of a caller, the caller being a module containing a function call to the callee function;

when the prototype of the callee function is not within the scope of the module, insert instructions in the caller to allocate a register save area in a memory;

when the prototype of the callee function is within the scope of the caller, determine whether the function call includes one or more unnamed parameters; and in response to determining that the function call includes one or more unnamed parameters, insert instructions in the caller to allocate a register save area in a memory;

determine whether all parameters of the function can be passed in registers; and insert instructions in the caller to allocate a parameter overflow area in the memory when all parameters of the function call cannot be passed in registers.

7. The computer program product of claim 6, wherein the inserting of instructions in the caller to allocate a register save area in a memory when it is determined that the function call includes one or more unnamed parameters further comprises:

determining whether all parameters of the function can be passed in registers; and inserting instructions in the caller to allocate a parameter overflow area in the memory when all parameters of the function call cannot be passed in registers.

8. The computer program product of claim 6, further comprising:

determining whether all parameters of the function can be passed in registers when it is determined that the function call only includes named parameters; and omitting instructions in the caller to allocate a register save area in a memory when all parameters of the function call can be passed in registers.

9. The computer program product of claim 6, further comprising:

determining whether all parameters of the function can be passed in registers when it is determined that the function call only includes named parameters; and inserting instructions in the caller to allocate a register save area and a parameter overflow area in a memory when all parameters of the function call cannot be passed in registers.

\* \* \* \* \*